US006112212A

United States Patent [19]
Heitler

[11] Patent Number: 6,112,212
[45] Date of Patent: Aug. 29, 2000

[54] SYSTEMS AND METHODS FOR ORGANIZING AND ANALYZING INFORMATION STORED ON A COMPUTER NETWORK

[75] Inventor: Jesse Heitler, Denver, Colo.

[73] Assignee: The Pangea Project LLC, Denver, Colo.

[21] Appl. No.: 08/929,388

[22] Filed: Sep. 15, 1997

[51] Int. Cl.$^7$ .................................................. G06F 17/30
[52] U.S. Cl. ......................... 707/501; 707/100; 707/500
[58] Field of Search .............................. 707/10, 100, 501, 707/500

[56] References Cited

U.S. PATENT DOCUMENTS

| | | | |
|---|---|---|---|
| 4,870,575 | 9/1989 | Rutenberg | 364/300 |
| 4,996,642 | 2/1991 | Hey | 364/419 |
| 5,752,022 | 5/1998 | Chiu et al. | 707/10 |
| 5,826,025 | 10/1998 | Gramlich | 707/4 |
| 5,887,133 | 3/1999 | Brown et al. | 707/540 |

FOREIGN PATENT DOCUMENTS

| | | |
|---|---|---|
| 0650126A | 4/1995 | European Pat. Off. . |
| 0762297A | 3/1997 | European Pat. Off. . |
| 0778534A | 6/1997 | European Pat. Off. . |
| WO 9721183 | 6/1997 | WIPO . |

OTHER PUBLICATIONS

Detcher, William you can't get there from here. (contrilling employee use of the Internet) (PC Week Netweek) v13, n17, pn 5 (2)_, Apr. 29, 1996.

Myles, A. et al., "A mobile host protocol supporting route optimization and authentication", IEEE Journal on Selected Areas in Communications, Jun. 1995, vol. 13, Issue: 5, pp 839–849.

Narendran, B. et al., "Data distribution algorithms for load balanced fault–tolerant Web access", The Sixteenth Symposium on Reliable Distributed Sysstems, 1997 Proceedings., Oct. 22–24, 1997, ISBN: 0–8186–8177–2, pp 07–106.

Laliberte, D. et al., "A protocol for scalable group and public annotations", Computer Networks and ISDN Systems vol. 27, No. 6, pp. 911–918 (Apr. 1, 1995).

Roscheisen, M. et al., "Beyond browsing: shared comments, SOAPs, trails, and on–line communities", Computer Networks and ISDN Systems vol. 27, No. 6, pp. 739–749 (Apr. 1, 1995).

*Primary Examiner*—Anton W. Fetting
*Assistant Examiner*—Shahid Alam
*Attorney, Agent, or Firm*—Foley, Hoag & Eliot LLP

[57] ABSTRACT

The invention includes an agency computer program that operates on a server of computer network that includes other servers, terminals, storage sites, and optionally any other suitable network device, such as network printers. The agency program can be understood as a program that is interdisposed between a user at a terminal and a server having information, such as an HTML page, that the user is interested in viewing. To this end, the agency captures accessing signals generated by the user at the terminal and representative of a request by the user to access a page signal, such as a HTML page, stored by the server. The agency captures the accessing signal and employs it to fetch from the server of the page signal that is of interest to the user. Optionally, the agency can request a page signal from another agency. The agency can then analyze and process the collected page signal so that some or all of the hypertext links within the page signal can be redirected to the agency. Moreover, the agency can identify whether the user has previously accessed this page signal and, if so, whether the user has made any modifications to the page signal. Instructions for making these user-generated modifications can be stored by the agency at an agency storage site. The agency can then combine the user-generated modifications with the data from the page signal to generate a new page signal that has been filtered to include the edits or modifications previously made by the user. In this way, the agency provides the user with a way to create personalized views of information stored on a network.

12 Claims, 3 Drawing Sheets

SYSTEMS AND METHODS FOR ORGANIZING AND ANALYZING INFORMATION STORED ON A COMPUTER NETWORK

FIELD OF THE INVENTION

The invention relates to systems and methods for organizing information stored on a computer network, and more particularly, to systems and methods for organizing and analyzing HTML pages stored on the world wide web.

BACKGROUND OF THE INVENTION

Computer networks have proven to be remarkably powerful tools for storing vast amounts of information. One particular computer network, the Internet, employs a non-proprietary design and protocol that allows a virtually endless number of file servers to connect into the Internet. Consequently, the Internet over the last few years has rapidly proliferated with every major university, business and a host of individuals connecting into the Internet and offering information for viewing and study by internet users.

Typically, an internet user employs a computer program called a browser that allows the user to view pages written in the Hypertext Markup Language (HTML). Typically, the browsers work by collecting from the user an address for an HTML pages stored on the internet. The user, by any conventional method, enters the address into the browser and the browser collects from the cite pointed to by the address, an HTML page that can be viewed by the browser. This allows the user to view the hundreds of thousands of HTML pages stored on the Internet.

For the browser to be useful, users must be able to determine the address of those web pages of interest to the user. To this end, search engines are provided that, at the direction of the user, will search through tens or hundreds of thousands of documents stored on the Internet to select those pages that are of interest to the user. To this end, the typical engine will direct the user to enter one or more keywords which are descriptive of the subject matter that the user is researching. The search engine will employ these keywords to identify pages stored on the Internet that contain subject matter related to the subject matter of interest to the user. Once the search engine has identified the addresses of web pages of interest to the user, the user can employ the browser to view each of these pages. Typically, the browser provides a book-mark feature that allows the user to create a book-mark, or reference, to those pages that the user deems to be the more relevant results of the search. Further, browsers typically allow the user to copy and store locally the pages, or portions of the pages, returned by the search engine. At a later time, the user can printout the stored pages and mark them up manually to highlight those sections of particular interest, or to make additional notations or references.

Accordingly, a browser and a search engine combine to provide a tool for performing general searches of the content of the Internet. However, this tool provides limited opportunity to organize and analyze information identified during searches of the Internet, and therefore users must rely on conventional, manual procedures, such as highlighting, marking-up, or photocopying, to edit or provide notations to the information retrieved during a search. Accordingly, it would be desirable to have more sophisticated tools for analyzing and organizing information stored on a computer network, such as the Internet.

SUMMARY OF THE INVENTION

Accordingly, it is an object of the invention to provide improved systems and methods for organizing information stored on a computer network.

It is a further object of the invention to provide network users with access to a space on a network from which the users can create and maintain modified views of the information content stored on the network.

It is yet a further object of the invention to provide a device that allows modified views of network content to be viewed from multiple terminals connected, or connectable, to the network, thereby allowing a user to migrate between different terminals of a network and be able to access a selected modified view of network data from any of these terminals.

It is a further object of the invention to provide improved research tools for analyzing information stored on a computer network.

Other objects of the invention will, in part, be set forth below and, in part, be obvious to one of ordinary skill in the art given the following description.

In one particular implementation, the agency is a computer program operating on a server and is adapted for coupling into a network communication path between the terminal and at least one server on the network for providing the user at the terminal with a modified view of a page signal stored on that server. The agency can include a redirector that receives the accessing signal from the terminal and which is capable of collecting or fetching the page signal from the server. The agency can also include a storage site, such as a conventional computer memory device, for storing user-generated data which can include instructions for modifying the page signal requested by the user. The agency can include a combiner that processes the page signal and the user-generated data to generate a filtered page signal that is representative of the page signal modified to include at least a portion of the user-generated data. In this way, the user at the terminal is provided by the agency with a selectively modified view of the page signal stored at the server. The user-generated data for modifying the page signal can be generated manually, automatically or by a combination of automatic and manual operations. In one embodiment, the agency includes a modifier processor that receives modification signals generated by the user at the terminal which are representative of instructions for how to modify the page signal requested by the user and fetched by the agency. In one practice, the user views the requested page signal while entering commands at the terminal which direct the agency to mark-up or otherwise modify the page signal to include text, graphics or other information generated by the user. The modifier can process the user's modification instructions and the data on the page signal to generate a set of instructions and data that can be stored at the agency storage site so that during a subsequent request to access the page, the combiner can access the user-generated data to again modify the page signal as previously requested by the user. In one embodiment, the combiner includes a parser for parsing the page signal into a data structure which is representative of the elements of a page signal.

In a further embodiment, the agency includes a persister for maintaining state information which is representative of an operating state for the agency server. For example, the persister can maintain state information representative of the page that a user was viewing at the time the user terminated its network connection. Accordingly, the agency can employ this state information at the beginning of the next network session for that user and return the user to the most recent page viewed. Thus, the persister allows a user to maintain the state of their network space between sessions on the network.

The agency can include processors for providing research tools. For example, the agency server can include a notecard processor, responsive to the user-generated instructions, for allowing a user to modify the page signal to include a data window that displays user-generated text. In this way, the user is able to modify a page signal to include a notecard like window display that includes notes generated by the user during the user's last visit to this page. Similarly, the agency server can include a transparency processor for allowing a user to modify a page signal to include data representative of a transparent overlay having user-generated data. Similarly, the agency server can include a carbon processor for allowing a user to copy selective portions of a first page signal and a second page signal to generate a filtered page signal that includes portions of both the first and second page signal. Other processors can be provided for providing other research tools.

In a further embodiment, the agency can include a directory process that provides a virtual directory space for storing filtered page signals. In this embodiment, the directory processor can include a parsing element for parsing an address signal, such as a URL signal, whereby portions of the URL signal may be employed as file names for storing information signals representative of instructions for modifying a page signal associated with that URL signal. In a further embodiment, the directory processor can also include an account process for providing a plurality of accounts each associated with a particular user to thereby provide each user with a subdirectory within a virtual file space.

It will also be understood, that the invention includes methods for providing agency computer programs capable of providing a user with modified views of the information content stored on a computer network. These and other aspects and embodiments of the invention will be more clearly understood by reference to the following description and attached drawings in which like reference numbers refer to like elements.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

To provide an overall understanding of the invention, certain methods, systems and devices of the invention will be discussed in the context of applications for providing research tools for organizing and analyzing information available from the Internet. However, it will be understood by persons of ordinary skill in the art that the methods, systems and devices described herein are equally applicable to all cases in which a user accesses data from a computer network, and other applications and uses of the invention can be made without departing from the scope thereof. For example, systems and methods as described herein can be employed for automatically filtering page signals stored on the Internet to remove selected types of information, such as hyper-text links, images, links to sound files, movies, or other types of data. Alternatively, the systems and methods of the invention can be employed to create views of data stored on a computer network which include information representative of the servers, services or other devices which have been employed in collecting and presenting the stored data. Other applications will, in part be described and, in part, be obvious from the following descriptions of the illustrated embodiments.

Figure 1:
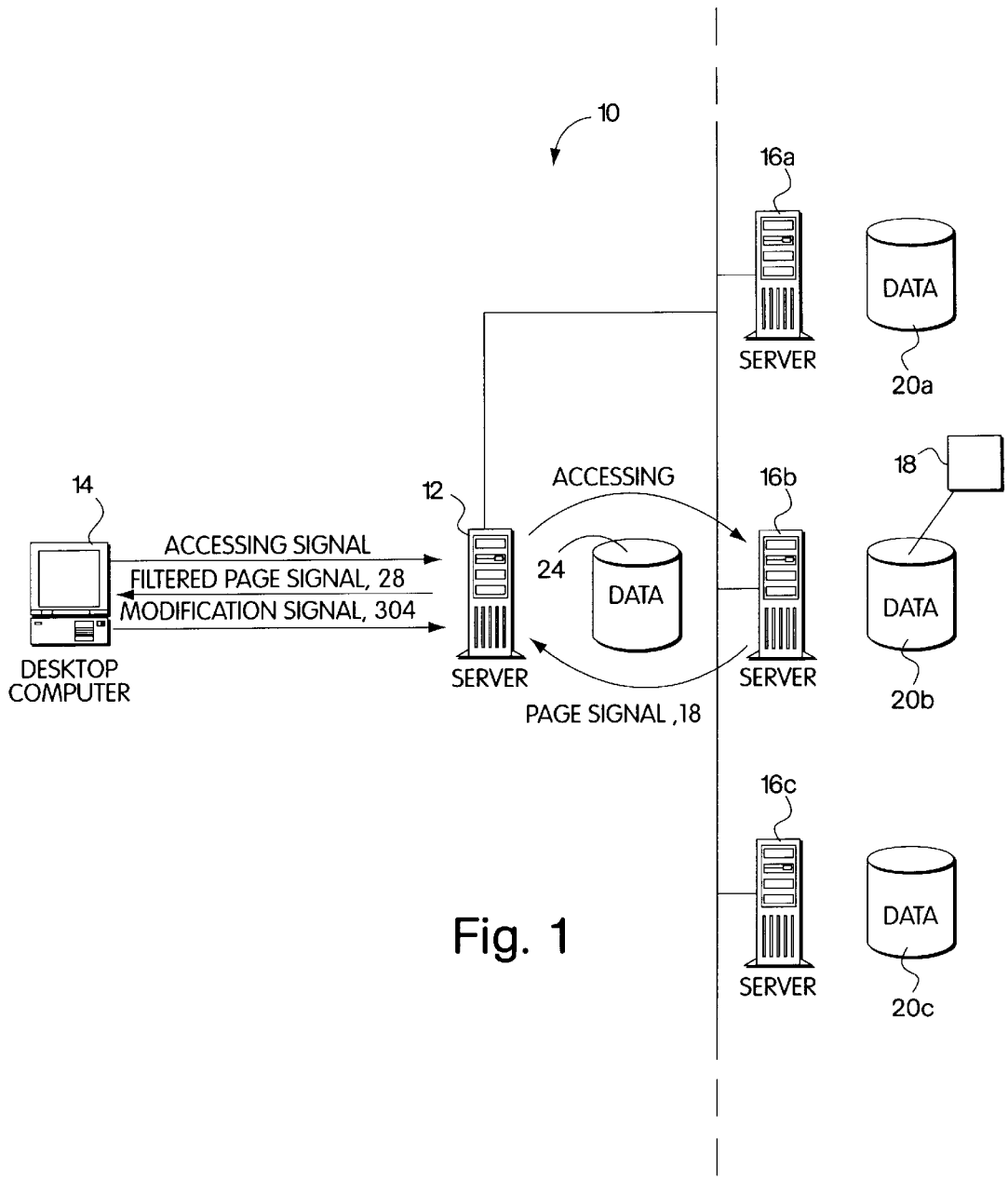
FIG. 1 is a representation of a network system according to the invention.

FIG. 1 depicts a computer network that includes an agency computer program running on a server 12. FIG. 1 illustrates the flow of data that can incur during the operation of computer network 10 which is allowing a user at the terminal 14 to employ the agency program on the server 12 to access information stored at any of the server sites 16a through 16c. It will be understood that FIG. 1 is a logical representation of the data flow that occurs during operations of the network 10. It is not to be understood as describing or limiting the network 10 to any particular type of configuration. For example, the network 10 can be a LAN, WAN, Intranet or any other type of network. Moreover, the network 10 is not limited to any configuration or topology, nor will FIG. 1 be understood to limit the network 10 to any particular type of protocol. However, for purposes of illustrating the system, the network 10 will be described as a TCP/IP network, and in particular the Internet and the World Wide Web service provided by the Internet.

The data exchanges depicted in FIG. 1 illustrate generally that the agency program operating on the server 12 acts as middle layer in the network which sits between the user at the terminal 14 and the servers 16a through 16c. In particular, a browser program operating on the terminal 14 can be employed by a user for issuing and accessing request signals which represents the user's request to access an HTML page 18 stored within a memory device 20b controlled by the server 16b. As shown in FIG. 1, the accessing signal 22 is directed to the agency server 12. The agency 12 analyzes and processes the accessing signal and generates a second access signal which is directed to server 16b. This second access signal is an instruction to access the HTML page 18 stored in the memory device 20. Responsive to this access signal, the server 16b transmits the page 18 to the agency server 12. As further shown on FIG. 1, the agency server 12 can also access the agency storage site 24 to collect therefrom user-generated data. The agency server 12 can then combine the collected page signal 18 with the user-generated data to return to the terminal 14 a filtered page signal 28. In this way, a user at the terminal 14 employs the agency server 12 to collect information from servers on the network 10. Moreover, FIG. 1 illustrates that the agency server 12 can process a collected page signal, such as the page signal 18, to edit or otherwise modify that page signal to include user-generated data. This modified page signal, hereinafter called a filtered page signal, is returned by the agency server 12 to the browser running on the terminal 14. Accordingly, the user at the terminal 14 receives a modified view of data stored on the network 10, such as the modified view provided by filtered page signal 28, which is generated from the page signal 18 stored in the network memory device 20.

FIG. 1 further depicts that a user at terminal 14 can employ the agency server 12 for generating and storing the modified views of the computer network content. As shown in FIG. 1, the user can employ terminal 14 and the browser program running thereon to generate modification signals 30 which are passed to the agency server 12. The agency server 12 under the direction of these modification signals, will edit a page, such as the HTML page 18, as instructed by the user. The agency server 12 can then store a set of modification instructions within the agency storage site 24. Upon a subsequent call to server 16b to provide the HTML page 18, the agency server 12 can search the agency storage site 24 to determine if any user-generated data has been created for the HTML page 18. If so, the agency server 12 can again modify the page signal 18 to include the edits and modifications previously entered by the user. In this way, the agency server 12 provides persistent storage of modified images of information stored on the network 10.

In the embodiment depicted in FIG. 1 the various elements, such as the terminal 14, the server 12, the servers 16a through 16c, the data storage devices 20a–c and the agency storage device 24 can be conventional network computer devices. For example, the terminal 14 depicted in FIG. 1 can be any terminal suitable for operating a browser program for viewing information stored on the computer network, such as the Internet. For example, the terminal 14 can be an IBM PC compatible computer system running the NETSCAPE browser program. Similarly, the server 12 can be any computer system capable of operating a computer program, such as the agency computer program, for accessing information stored on a data network, and for performing data processing functions. The agency storage site 24 can be any suitable memory device, and optionally can be a persistent or volatile memory device. In one example, the agency storage site is one or more hard disk drive units coupled to and operated under the control of the server 12. The servers 16a through 16c can be any computer systems suitable for operating as file servers for delivering information over a network system. Continuing with the above example, each of the servers 16a through 16c can be Internet file servers capable of transferring data according to the HTTP transfer protocol. It will be understood however that any suitbale transfer protocol can be practiced with the systems described herein, including extensions and developments to HTTP. In one example, the server can be a PC clone running the WINDOWS NT operating system. The memory devices 20a through 20c depicted in FIG. 1 can be any conventional memory device suitable for storing computer readable data and optionally can be persistent memory devices, such as disk drives, coupled and controlled by a respective one of the servers 16a through 16c.

Figure 2:
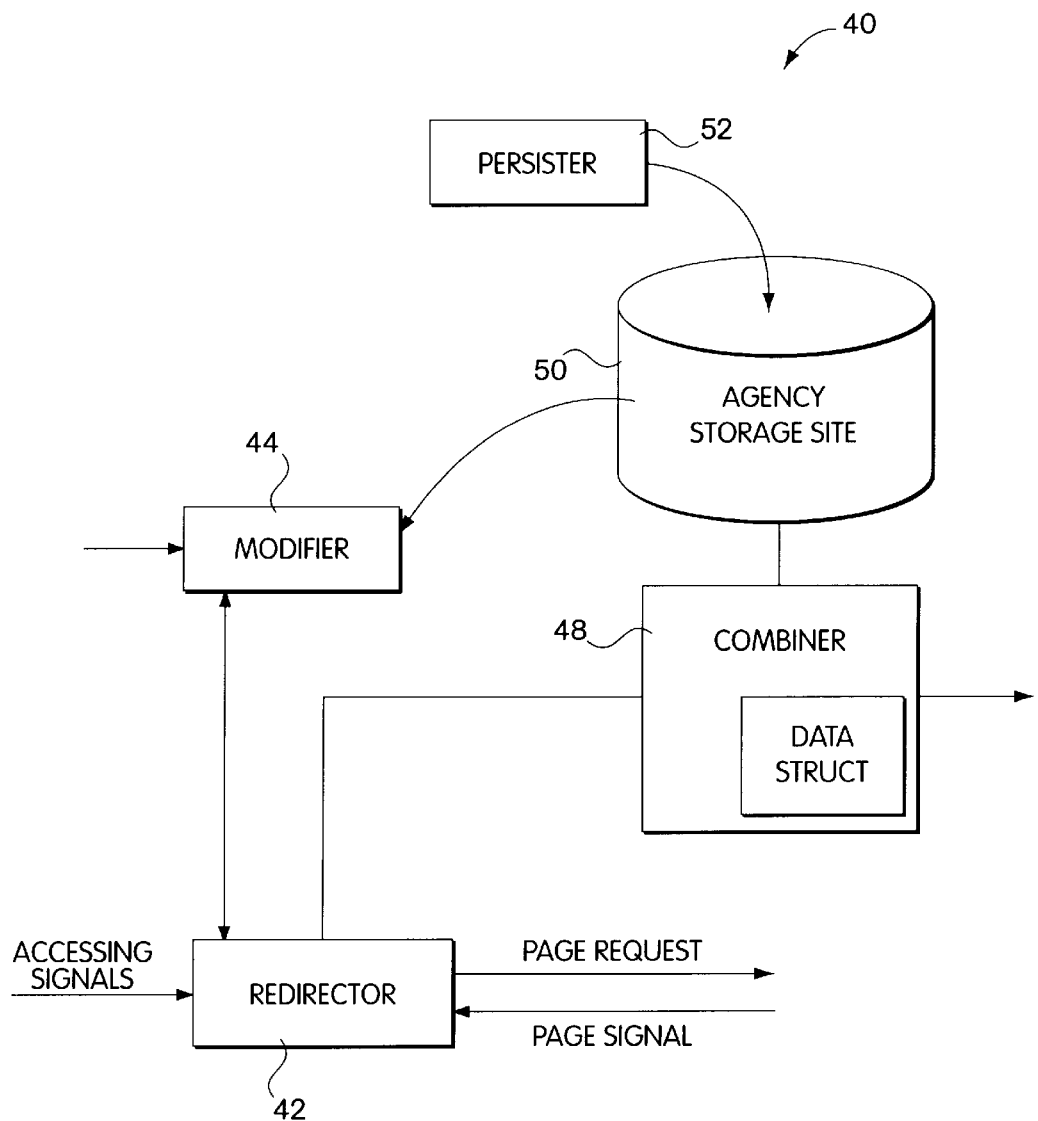
FIG. 2 is a functional block diagram depicting the software components of one agency program according to the invention.

The agency computer program operating on the server 12 depicted in FIG. 1 can be understood from the functional block diagram depicted in FIG. 2. In particular, FIG. 2 is a functional block diagram that depicts the modules and data paths that operate together to provide the functions of the agency computer program. The agency computer program can be a conventional program written in high level computer language, such as the C or C++ program languages, and certain examples of such code are set forth below. However, it will be understood that although the agency depicted in FIG. 2 is a computer program, the agency can also be a hardware device, or a combination of software and hardware devices working together. Moreover, it will be understood that the individual functional blocks depicted in FIG. 2 are merely representative of the different functions performed by the agency and that the depicted blocks can be organized, combined, or otherwise modified into an alternative block structure.

The agency program 40 depicted in FIG. 2 includes a redirector 42, a modifier 44, a combiner 48, an agency storage site 50, and a persister 52. The depicted agency program 40 operates to provide a user at the terminal 14 depicted in FIG. 1 with an intermediate network space that has a persistent presence on the network and which contains information which allows for the filtering and modification of information stored on the network to conform to a view of information stored on the network that has been modified as directed by the user. This space can be the users home address on the network. By providing this intermediate space on the network, a user can log into any terminal coupled to the network, and by connecting to the information to the network through the user's agency, collect and maintain a modified view of the network data. In one embodiment, the agency allows a user at terminal 14 to view and modify web pages stored on the World Wide Web.

The redirector element 42 depicted in FIG. 2 can be a software module, such a C computer language function, or a C++ member function. The redirector 42 functions to receive accessing signals from a user at the terminal 14, or other elements of the agency 40, and employs these accessing signals to make a page request to a server on the network that has the HTML page being requested by the user. Further, the redirector 42 then collects the HTML page and passes the HTML page to the combiner 48.

FIG. 2 depicts each functional block as an element of the software system. However, it will be apparent to one of ordinary skill in the art of computer and software engineering that each element can be a hardware device that operates within a data processing unit to configure the data processing unit to operate as the device depicted as system 10 or as a subsystem of the system 10. Moreover, it will be apparent to one of ordinary skill in the art of computer and software engineering that the functional blocks depicted can be combined elements of hardware and software that operate to implement the functions of the system 10.

Table 1 presents in pseudo-code one embodiment of a redirector element capable of responding to an accessing signal and collecting a HTML page from an Internet web server.

TABLE 1

Redirector

A request signal, based on the HTTP 1.0 protocol specification, is of the form:
    METHOD /accountInfo/http://actual.page.com/actualDoc.html [other characters]
    where METHOD may be GET, POST, or any of the other HTTP methods.
A modification signal is of the form:
    METHOD /accountInfo/modificationInstruction [other characters]

Function Definitions redirector( )- the main function of the redirector.
isModificationSignal( )- returns true if the signal is of the latter type.

TABLE 1-continued parseAccount( )- pulls out the account element of the signal.
parseSource( )- pulls out the source URL element of the signal.
listenOnSocket( )- blocks while waiting for incoming connections
findModificationInstructs( )- retrieves relevant instructions from the agency storage site.
combine( )- invokes the combiner.
requestURL( )- issues a request to a server for a document.
recordState( )- is a call to the persistor to allow it to maintain information about the state of a
given account. It is explained below.
writeToSocket( )- sends the resultant signal to the terminal.
loseSocket( )- complete the http transaction in preparation for the next iteration through the loop.

Function Outline

```
redirector( ) {
   while(1) { /* loop forever */
      reqSignal = listenOnSocket( );
      reqAccount = parseAccount(reqSignal);
      if (isModificationSignal(reqSignal) == true) {
         retSignal = modifier(reqSignal, reqAccount);
      } /* endif */
      else {
         reqSourceURL = parseSourceURL(reqSignal);
         srcSignal    = requestURL(reqSourceURL);
         modInstructs =findModificationInstructs(reqAccount, reqSourceURL),
         retSignal = combine(srcSignal, modInstructs)
         /* retSignal in this case is the filter signal */
      }/* end else */
      recordState(reqAccount);
      writeToSocket(retSignal);
      closeSocket( );
   } /* loop */
```

Table 1 illustrates in pseudo-code format one example of a redirector module, such as the redirector module 42 depicted in FIG. 2. The pseudo-code provided in Table 1 describes a redirector that operates under the HTTP protocol. However, it is to be understood that the redirector is not to be so limited and the systems described herein can comply with a plurality of different transfer protocols both conventional and/or proprietary. However, as the hypertext transfer protocol is well known, this protocol is employed for purposes of illustrating the systems and methods of the invention.

As is generally known, an HTTP transaction consists of four parts: a connection, a request, a response, and a close. In general, an HTTP client program, such as a browser program, establishes a TCP connection to the well-known port for HTTP (port 80) on a remote host. Next, the client sends a request to the HTTP server. After the HTTP server sends a response, either the client or the server closes a connection. In general, every HTTP transaction follows the same basic pattern. More information on the HTTP protocol can be found in Jamsa et al., *Internet Programming*, Jamsa Press, Las Vegas, Nev., ISBN1-884133-12-6 (1995).

The redirector described in Table 1 functions, in part, as a conventional web server. Specifically, the redirector allows a user to establish a connection, through an HTTP client like a browser, which will send an HTTP request to the server. A user at the terminal 14 of FIG. 1 can connect to the agency server 12 of FIG. 1 through the redirector 42. Specifically, the redirector 42 exemplified in Table 1 includes functionality which causes the redirector to wait for an incoming connection from a user. The request is typically an HTTP client request, which will direct the redirector 42 to perform a certain function. HTTP commands are generally referred to as methods, and the methods that the exemplary redirector of Table 1 responds to include GET, POST, or any of the other HTTP methods.

As further shown in Table 1, the redirector is listening for a request signal or a modification signal, the forms of both of these signals being shown in Table 1. In both cases, these signals begin with a HTTP method command followed by account information. In this embodiment of the agency, users of the agency server are assigned one or more accounts, each of which the user can log into. The accounts provide certain flexibility, such as allowing a user to set up several different network spaces, such as a work space, a home space an entertainment space, or any other type of personalized environment the user wants. Furthermore, the agency server 12 can employ account information as is conventionally done to restrict a users access to selected categories of information, or functions. For example, in the business environment, a company can provide accounts to several classes of employees, providing each class of employee with a respective account. Each account can add or filter certain information or types of information from network content being accessed by the user and provided through the agency 12. Other applications of account limitations can be employed with the present invention without departing from the scope thereof. As further shown in Table 1, a request signal includes not only a method command and account information but also includes a URL for a page being requested by the client.

In a typical operation of a client/server system running on the Web, the URL encoded within the request signal can be employed by the client program to generate a get request for the identified page. This would direct the client to connect to the HTTP server that stores or controls the page of interest. In the systems described herein, this URL is wrapped within a request to transfer information to the agency server 12. In one practice, this is accomplished by having the agency server provide a set of hypertext links to the user at terminal 14, when the user 14 connects to its home page in the selected account held by the agency 12. Each of the hypertext links presented to the user, are written as shown in table 1 so that a connection is first formed with the agency 12 and the URL of the page referred to by the hypertext link is passed to the agency 12 when a connection is formed. In this way, when a user clicks on a hyper text link within a Web page, a connection if formed to the agency server 12 and a request to access the Web page referenced by the hyper text link is passed to the agency server 12. In this way, requests for network data are redirected through the agency server 12.

The operation of the redirector depicted in Table 1 can be understood from the pseudo-code provided therein. Specifically, function outline for the redirector shows that the redirector, which is the main function of the redirector 42 depicted in FIG. 2, begins with a while-loop that loops forever. While in this while loop, the redirector 42 listens on the socket to detect a request signal. Once a request signal is detected, the request signal is analyzed to determine the account information. Optionally, once account information is determined, the redirector 42 can implement security level checks, billing balance checks, or any other pertinent information to determine any restrictions that are to be placed on this request.

Table 1 further shows that the redirector first tests to see if the detected request signal is a modification signal. If the request signal is a modification signal, the redirector passes the account information and request signal to the modifier program 44. Alternatively, if the request signal is other than a modification signal, the redirector of Table 1 parses the request signal to determine a URL for a page being requested. Once the URL is parsed from the request signal, the agency server 12 can request the page associated with that URL from the Web server that is responsible for providing that Web page. In a next step, the redirector determines if there any modification instructions for the requested Web page and user. The modification instructions are sent with the requested Web page to the combiner module 48 that modifies the requested Web page as directed by the modification instructions to generate a return signal that represents the filtered page signal.

Optionally, the redirector then records the state of the server state, for instance, noting that the user has just looked at a selected Web page and has been provided with a modified view of that Web page. Then the redirector writes the filtered Web page to the user and closes the connection.

Table 1 presents a redirector that parses account information from the request and modification signal to collect information about the user. In one embodiment, the agency can include a directory process that employs the account information to provide a virtual directory space for storing filtered page signals, modification instructions and other data associated with one or more users. In this embodiment, the directory processor can include a parsing element for parsing an address signal, such as a URL signal, whereby portions of the URL signal may be employed as file names for storing information signals representative of instructions for modifying a page signal associated with that URL signal. In a further embodiment, the directory processor can also include an account process for providing a plurality of accounts each associated with a particular user to thereby provide each user with a subdirectory within a virtual file space. The interface between all the elements of the application can be through the URL. In one embodiment CGI is employed as CGI allows for the creation of a virtual directory space by passing all of the URL information beyond the script name to the script as an argument. For example, if the script is located at cgi/script.prl, the URL is therefor http:Hzoo.cs/cgi/script.prl. If the URL http:Hzoo.cs/cgi/script/test/directory is accessed, script.prl is invoked and the rest of the path, /test/directory is passed through environment variables to the script. Using this method, the systems described herein can construct all of the URLS in the form http:Hserver/script/user/file/destination-url. Where "user" can be a signal representative of the account name, "file" is a signal representative of the file being accessed from the account, and "destination-url" can represent the page to be modified. The "file" signal can represent the set of instructions for modifiying the "destination"url. The URL therefore provides a way for files within the account to be stored and retrieved. This allows each script to know the user's account name and desired file for each invocation of the script. Optionally, the systems separate account name and desired file so that each user would be able to have multiple files for different purposes. In a further embodiment, the agency 12 can include a processor that processes URLs of the above form to provide a directoty space in which files and accounts can be provided and in which data can be stored and retrieved as a function of the URL.

The redirector 42 as shown from the pseudo-code of Table 1 calls the modifier 44 if a modification signal is received from the user. The modifier 44 depicted in FIG. 2 can be a C language function, or a C++ language member function, or any suitable format of computer code. The modifier 44 receives from the redirector modification signals representative of instructions generated by the user at the terminal 14 for modifying a HTML page signal. Optionally, the modifier 44 can cause the redirector 42 to fetch an HTML page being modified by the user if the HTML page is to be employed when making modifications. The modifier 44 can also generate a set of instructions representative of instructions readable by the combiner 48 for modifying the content of a web page. In the depicted embodiment, the modifier 44 stores the instruction signals within the agency storage site 50. The agency storage site 50 can be a memory device coupled to the network, coupled to the terminal 14, or otherwise connected to the network 10. Optionally, the agency storeage site 50 can allow for cache storing of selected HTML pages to imporve access time for the system. The agency storage site 50 can be accessed by the combiner 48 for collecting the instructions and employing the instructions for modifying the HTML page signal collected by the redirector 42. A function explanation for the modifier 44 is presented in Table 2.

TABLE 2

Modifier
Function Explanation

The modifier accepts an account and a modification signal. It parses the modification signal into a set of instructions which it then either completes or saves in the agency storage site. The instructions may be directions to insert text into a certain place in a given page, or to remove text, or to modify a page in any other way. An instruction may direct the modifier to remove a set of other instructions from the agency storage site. This type of instruction is carried out by the modifier, but does not result in new data being saved.

A return signal is generated either by the modifier or by invoking combine( ) (the combiner).

Table 2 provides a functional explanation of the operation of a modifier, such as the modifier 44 depicted in FIG. 2. The operation of the modifier 44 varies depending on the functionality of the server 12, however, in most applications the modifier will function to provide the user at terminal 14 with a set of controls that allows for the user to input changes the user would like to see within the HTML document being requested. The modifier will then process this user-generated information to create a set of instructions that can be stored within the agency storage site 24. Optionally, the storage or retrieval of instructions can be performed as a function of account information provided by the user. This allows the agency 12 to control the types of modifications that a user can make, and to control the documents that a user can modify. Other methods for controlling the functions and contents that a user can employ or modify can be practiced with the present invention without departing from the scope thereof.

One example of a modifier allows a user to generate a notecard that is representative of information generated by the user and which the user wishes to associate with one or more selected HTML pages. In this embodiment, when the user connects to the agency 12 and transmits a modification signal, the modifier 44 inspects the account information, verifies that the user is allowed to make the requested modifications to the selected page, and creates instruction signals such as instructions for creating a procedure, such as a JavaScript procedure, that can be used to provide to the user a text field into which the user can enter data. In one practice, the instructions direct the browser to launch a second browser window and to provide a text field within that second window that allows a users to write text into the window. Alternatively, the instructions can direct the browser to create a frame into which text can be entered. In a further alternative embodiment, the instructions can be representative of an embedded program or Applet, such as a JAVA Applet. Accordingly, it will be seen that the modification instructions can include any data set that is representative of a set of commands that can be inserted into, either in part or in whole, a page signal, and that can be understood by the browser program to create a notecard for entering data. The development of such instructions follows from principles of HTML programming well known in the art and discussed in detail in Graham, *HTML Sourcebook*, Wiley Computer Publishing, third edition (1997), which is incorporated by reference herein. After, the user enters data into the text field, the user clicks on a control, such as a button, when finished. This provides an event that can signal the browser program to transmit the data entered by the user, which is user-generated data, to a server, such as the agency server 12.

The modifier 44 can process the user ,enerated data to create the modification instructions and to generate a set of instructions that can be stored within the agency storage site 50 of FIG. 2. For example, continuing with the notecard application, it can be seen that the modifier 44 can receive a set of modification instructions which includes the user generated text created by the user when adding text into the text field presented by the agency server 12. The modifier 44 can process the text data to generate a set of HTML tags and elements, scripts, applets or other commands, which can be inserted into an HTML document, thereby providing the HTML document with functionality for creating a pop-up window that will display the user generated text each time the user selects the respective HTML page. The modifier 44, therefore, creates and maintains a database of instructions for modifying respective HTML pages, and this database, therefore, can act as a persistent database of information for generating modified views of information stored on the computer network, such as the Internet.

In other applications, the modifier, optionally at the user's direction, can generate instructions for inserting sound, image, video, frames and other data into the HTML page being modified. Further, other applications allow users to select portions of text, or other information within a web page and to capture this information and provide it to the modifier as user-generated data for creating a modified view of the web page.

For example, a highlighting application allows a user to select portions of a page to be highlighted, and responsive to the user-selected text, the modifier generates instructions representative of commands, such as HTML commands, that the browser can employ to display the selected text in an alternative color, such as yellow. In another application, the user can select portions of the page, including the whole page, to be copied, and the modifier, responsive to the selected portions can generate instruction signals representative of HTML commands for generating a second HTML page having the selected portions reproduced thereon. Similarly, for long web pages, the systems of the invention can provided search features, such as java applets that let a user identify a keyword in the web page. The java applet can then identify the number and locations of occurences of the keyword within the webpage. The java applet can provide the modifier with information as to the occurences of the keyword within the page and the modifier can generate a set of instructions that directs the combiner to create a modified web page that displays only a selected number of words before and a selected number of words after the keyword, providing a display feature similar to the Kwic format offered by the LEXIS/NEXIS computer database. Further, the modifier can generate instruction signals representative of HTML commands that are to be added to the HTML source of a selected web page to appear within the web page and thereby provide a modified web page that appears as a composite, such as a web page with a transparency overlay.

TABLE 3

Combiner
Function Definitions combine( ) takes a page signal and a set of modification instructions. It returns a filtered page signal. It is the main function of the combiner
parsePageSignal( ) parses a page signal into a data structure composed of elements that can be independently modified.
firstElement( ) and nextElement( ) returns the first or next element of the page signal data structure respectively.
isEndOfElements( ) tests if there are more elements to be handled.
doModification( ) makes changes to a given element as specified in the modificationInstructions.
createPageSignal( ) combines the elements of a page signal data structure back into a page signal.

TABLE 3-continued

Function Outline

```
combine(pageSignal, modificationInstructions) {
  pageStruct = parsePageSignal(pageSignal);
  curElement = firstElement(pageStruct);
  while (isEndOfElements(pageStruct) != true) {
    doModification(curElement, modificationInstructions);
    nextElement(pageStruct))
  }
  filterSignal = createPageSignal(pageStruct);
  return(filterSignal);
}
```

Table 3 illustrates one example of a combiner that operates to employ modification instructions stored in the agency storage site 50 to generate modified views of the data on a computer network. Specifically, the combiner example provided in Table 3 will combine a page signal, being the HTML page requested by the user, along with the modification instructions stored in the agency storage site 50. In the exemplary combiner of Table 3, the combiner creates a page structure by parsing the HTML page signal into a data structure that can be representative of a tree-like structure having parsed out the different tag and elements of the HTML page being modified. The combiner can then identify the different elements within the page structure and add modifications into the page. Modifications can be added by an insertion process that can add text, images, audio, video, programs and applets into the page. The modifications added to the page follow from the modification instructions stored within the agency storage site 50 and act to provide the HTML page with a set of commands that modifies the image of the HTML page provided to the user. This modified image is deemed a filter signal by the combiner of Table 3 and is returned to the module of the agency server 12 that called it, such as the redirector 42, once its action is complete.

Table 3 describes a combiner element that includes a parser. The parser can parse a page signal, such as an HTML page, into a data structure of elements that can be modified independently. An example structure would be a tree with HTML tags and attributes as the nodes and the leaves. The development of such parsing programs is known in the art and any suitable parsing program can be employed with the present invention without departing from the scope thereof. The combiner program presented in Table 3 further includes a createpagesignal( ) function that essentially operates to do the opposite of the parse page signal function. Specifically, the createpagesignal( ) will create a page signal out of a data structure. The elements of that data structure may have been modified since it was formed by the original parsing function, therefore allowing for a filtered page signal to be created. Again, the development of a createpagesignal( ) function follows from principles in the art of computer programming, including those taught in the Graham book referenced above, and any suitable createpagesignal( ) function can be employed with the present invention without departing from the scope thereof The agency storage site can be any suitable computer memory device, and optionally is a persistent memory device that allows for storing information between connections to the agency server. The agency storage site can also include a computer program that allows a module within the agency server 12 to find modification instructions stored therein. For example, the agency storage site can include an interface function wherein the arguments to the function are an account identifier (retrieved from the persister module or another suitable module) and a URL. The return value would be the data set which contains the instructions for the combiner on how to modify the page associated with the given URL. The development of such an interface function follows from principles well known in the art of computer programming, and any suitable function can be employed with the present invention without departing from the scope thereof.

A typical set of modification instructions may include instructions to rewrite an absolute address if it has originally been presented as a relative address. A further modification instruction would be to pre-prend the agency server address and account information to a URL site. This of course allows for amending the hyper-text links within an HTML page to be redirected to pass from the user through the agency server 12. Other modification instructions can be employed by the modifier with such modification instructions being selected according to the application being performed by the agency server 12.

The persister 52 depicted in FIG. 2 can also be a software module and operates to maintain state information for, in this embodiment, each of the accounts. The persister module can keep track of the history of sites requested or information on the modifications that are being made to the pages requested by a given account. Thus, the persister allows continuous applications to be built on top of the stateless HTTP protocol.

Figure 3A:
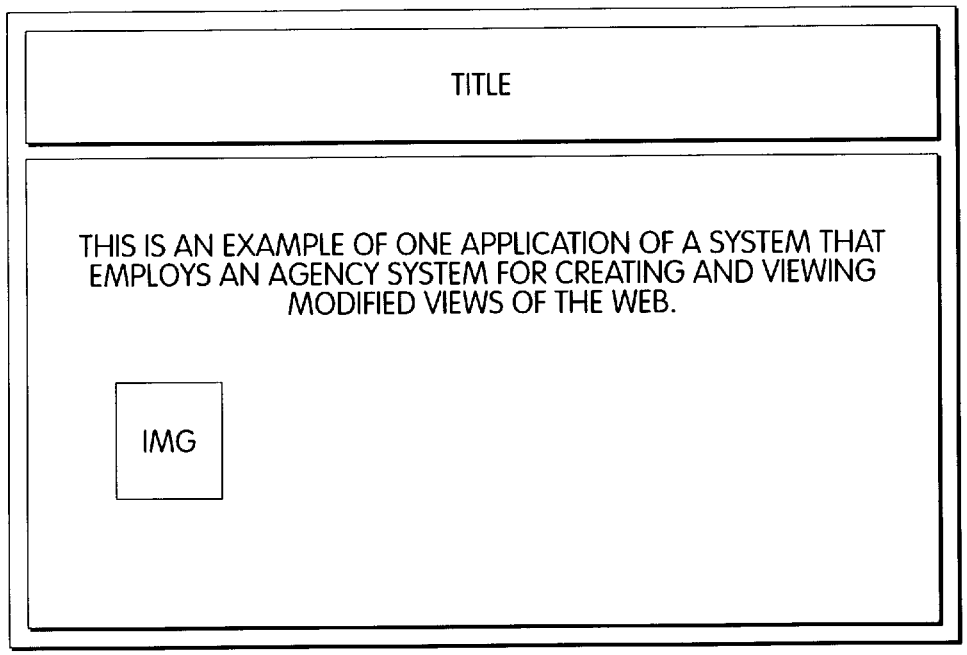
FIGS. 3a and 3b show a page signal and filtered page signal respectively wherein the filtered page signal has been processed by an agency program such as that depicted in FIG. 2.
Figure 3B:
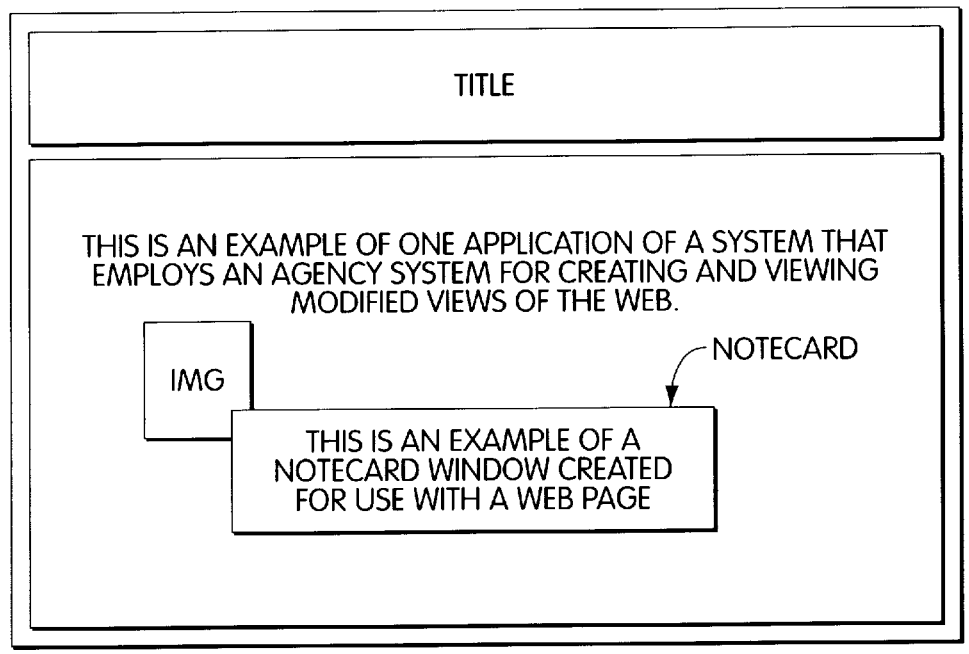

FIGS. 3a and 3b depict an HTML page and a modified HTML page respectively. Specifically, the HTML page depicted in FIG. 3 is representative of an HTML page stored at a storage site under the control of an Internet Web server, such as the storage site 20b operating under the control of server 16b depicted in FIG. 1. FIG. 3b illustrates the HTML page of 3a modified to include a notecard window that contains user generated text information. The modified HTML page of FIG. 3b can be generated as set forth above by using an agency server 12 similar to the agency server 12 depicted in FIG. 2.

It will thus be seen that the invention efficiently attains the objects set forth above, among those made apparent from the preceding description. It will also be understood that changes may be made in the above construction and foregoing sequences and operations without departing from the scope of the invention. For example, systems and methods of the invention can allow for developing lists for prioritizing pages by their a user selected criteria of importance, and creating annotated bookmark lists. Further, modifications can include explicit caching, online modification of cached documents, Pop-up note cards for each link before it is followed, and in lined priority marker.

It accordingly is intended that all matters shown in the accompanying drawings be interpreted as illustrative rather than in any limiting sense. It is also to be understood that the following claims are intended to cover all of the generic and specific features of the invention as described herein, and all statements of the scope of the invention which as a matter of language, might be said to fall therebetween.

I claim:

1. A system for providing a network user with a modified view of data stored on a network, comprising an interface process for receiving an accessing signal having identification information for identifying a page signal stored at a storage site coupled to the network, a redirector, responsive to said identification information, for collecting said page signal, a directory mechanism, responsive to said identification information, for identifying an information signal representative of data for modifying said page signal, and a modifier for processing said information signal and said page signal to generate a filtered page signal representative of said page signal modified as a function of said information data signal, whereby said filtered page may be provided in response to the user request to provide the user with modified views of data stored on the network.

2. A system according to claim 1 including a data generator responsive to input provided by the user for generating said information data signal for modifying a page signal, whereby the user may control the production of information to create selectively modified views of data.

3. A system according to claim 1 including a markup processor for generating information representative of HTML data suitable for being inserted into an HTML page stored on the network storage site.

4. A system according to claim 1, wherein said directory mechanism includes a process for retrieving an information signal stored within a file space.

5. A system according to claim 4 further including a string parser for parsing said identification signal, whereby portions of said identification signal may be employed to provide a file name for retrieving data files having information representative of said generated information signal for modifying said page signal.

6. A system according to claim 1 wherein said string parser includes means for parsing a URL signal, whereby portions of URL signals may be employed as file names for retrieving information signals for modifying a page signal associated with said URL signal.

7. A system according to claim 1 wherein said directory mechanism includes a processor for generating and storing a data file having said generated information signal and having a filename generated as a function of said identification signal information associated with information data signal.

8. A system according to claim 1 wherein said directory mechanism includes a sub-directory processor for generating a user subdirectory for separately storing data files of information signals generated by a particular user.

9. A system according to claim 1 including a persistent memory device for providing persistent storage of the information, whereby the user can store modified views of data.

10. A system according to claim 1 including a caching mechanism for cache storing page signals.

11. A system according to claim 1 wherein said redirector includes means for modifying link signals in said page signal to redirect requests said link signals to a selected process on the network.

12. A system according to claim 11 further including means for redirecting requests to said interface process, whereby links activated by the user will generate requests to said interface process.

* * * * *